US011577441B2

(12) United States Patent
Erdmann et al.

(10) Patent No.: US 11,577,441 B2
(45) Date of Patent: Feb. 14, 2023

(54) SIDE FEEDER HAVING SEPARATE PRESSURE REGIONS FOR DEGASSING

(71) Applicant: Extricom Extrusion GmbH, Lauffen a. N. (DE)

(72) Inventors: Michael Erdmann, Lauffen a. N. (DE); Thomas Bauer, Heilbronn (DE)

(73) Assignee: Extricom Extrusion GmbH, Lauffen a. N. (DE)

( * ) Notice: Subject to any disclaimer, the term of this patent is extended or adjusted under 35 U.S.C. 154(b) by 114 days.

(21) Appl. No.: 16/783,542

(22) Filed: Feb. 6, 2020

(65) Prior Publication Data

US 2020/0346385 A1 Nov. 5, 2020

(30) Foreign Application Priority Data

Feb. 6, 2019 (DE) ..................... 10 2019 102 976.7

(51) Int. Cl.
*B29C 48/76* (2019.01)
*B29C 48/694* (2019.01)

(52) U.S. Cl.
CPC ........ *B29C 48/767* (2019.02); *B29C 48/6945* (2019.02)

(58) Field of Classification Search
CPC .......................... B29C 48/767; B29C 48/6945
See application file for complete search history.

(56) References Cited

U.S. PATENT DOCUMENTS 3,572,647 A * 3/1971 Staheli .................... B29B 7/845 415/72
7,607,817 B2 * 10/2009 Samann .................. B29B 7/421 366/85
9,688,003 B2 * 6/2017 Stirner .................. B29C 48/763

FOREIGN PATENT DOCUMENTS

DE 102013208993 A1 11/2014
EP 2218568 B1 8/2010
EP 1 977 877 B1 12/2011
EP 2860013 B1 4/2015

* cited by examiner

*Primary Examiner* — Galen H Hauth
(74) *Attorney, Agent, or Firm* — Tucker Ellis LLP; Michael G. Craig; Heather M. Barnes

(57) ABSTRACT

The invention relates to a screw extruder (29) having a housing (30) comprising an intake housing (4), a degassing housing (5), and at least one housing bore (21, 22) running in the interior of the degassing housing (5) and implementing at least one internal wall segment (25; 26; 27; 28) of the degassing housing (5) and serving for receiving at least one auger shaft (7), and wherein the at least one wall segment (25; 26; 27; 28) of the at least one housing bore (21, 22) comprises at least one partition wall (13, 33) protruding into the at least one housing bore (21, 22) in the region of the degassing housing (5), and wherein at least one filter element (8) is disposed in the interior of the degassing housing (5) and at least partially encompasses the at least one auger shaft (7) and bears on the partition wall (13) in regions for implementing at least two spatial pressure regions (11, 12) sealed off from each other.

20 Claims, 7 Drawing Sheets

9
20
21
5
22
36
8
31
10
10
32
9

SIDE FEEDER HAVING SEPARATE PRESSURE REGIONS FOR DEGASSING

RELATED DOCUMENTS

This application claims priority to German Patent Application No. 10 2019 102 976.7, filed Feb. 6, 2019, and titled SIDE FEEDER HAVING SEPARATE PRESSURE REGIONS FOR DEGASSING, of which is incorporated by reference in its entirety herein.

BACKGROUND

The invention relates to a screw extruder having a degassing housing. The invention further relates to a method for processing bulk material.

One such screw extruder is known from the European patent specification EP 1 977 877. Said publication describes a method for feeding powdered bulk material into an extruder comprising a housing having bores parallel to each other and partially penetrating each other and having auger shafts disposed therein. The housing comprises an infeed opening downstream of an intake zone. Solid material transport of powdered bulk material takes place in the intake zone by partially filling said intake zone. Said zone comprises a gas-permeable wall segment at which a bulk material layer is generated without bulk material penetrating through said wall segment. The wall segment comprises an inner wall bounding the bore, wherein a gap is formed relative to the bore wall, offset by a partial circular ring cross section. The gas-permeable wall segment is connected to a pressurized gas source by means of a pressure flushing line.

Prior art associated therewith is described in the European patent specification EP 2 218 568 B1, relating to the embodiment of the vacuum housing segment and thereby providing a filter used there in the form of a metal non-woven. The use of a metal non-woven is intended to achieve significantly greater filter fineness than is the case when using sintered metal, whereby the technical teaching of the European patent specification EP 2 218 568 is different from that of EP 1 977 877 B1. Replacing such a very thin metal non-woven using relatively few hand movements is further intended to be possible for the case that clogging occurs as a result of the bulk material particles, despite the fineness of the filter. Said vacuum housing segment is provided in a screw extruder for processing at least partially powdered bulk material designed for this purpose.

The document DE 10 2013 208 993 A1 relates to a screw extruder, a method for processing bulk material, and a processing system for processing bulk material. The focus of the present prior art is on the embodiment of a vacuum filter insert providing a protective element for adapting to the at least one housing bore having cross section partially having the shape of a circular arc segment. A long service life of the vacuum filter insert is thereby ensured. Because the shape of the cross section of the protective element is implemented corresponding to the at least one housing bore, the bulk material can be wiped off from the protective element by means of a handling element during operation of the screw extruder. Particles of bulk material suctioned to the protective element are thereby continuously removed by the handling element, so that continuous cleaning of the protective element takes place.

A screw extruder having a degassing device following a different technological principle is further disclosed in the document EP 2 860 013 B1, wherein what is known as a reverse ventilation is provided and generated by a blower device bringing about a gas flow acting opposite the transport direction of the material transported by means of the transport auger shaft.

In addition to said prior art addressed in EP 2 860 013 B1 and following a different functional principle, the screw extruders according to the prior art are very complicated in design and therefore very expensive. The protective elements partially provided therein are additional components further required fit accuracy that can barely be fulfilled in tough, long-term operation of such screw extruders, in turn requiring regular replacement and re-installation during operation. Due to the sometimes extremely high temperatures, such replacement work is associated with a high hazard risk for the operating personnel. The systems also require complex mounting elements.

Relative to the overall length, that is, the length of the screw extruder housing, a relatively small filter area is furthermore available in the present prior art, which can lead to rapid clogging during operation, associated with the necessity of frequent interruptions of the extrusion process for the purpose of replacement. Interruptions in the running extrusion process can have negative effects on the extruded material, however, and result in significant additional costs. The selection of available filter materials is also limited.

Based on said disadvantages of the prior art, the invention therefore addresses the technical problem of avoiding said disadvantages and providing a screw extruder having a highly flexible, robust degassing device and furthermore able to be produced inexpensively.

Such a degassing device is further intended to be usable for side feeding machines, for which the term side feeder has also become established, as well as for main screw extruders, such as main extruders. The degassing device is also intended to be combined with further system components.

In particular, a large filter area is to be achieved and it should be possible to have one or more vacuum regions or compressed air regions available.

The various considerations are achieved by a claimed device and by a claimed method. Advantageous embodiments of the technical teaching are described in the claims.

To this end, a screw extruder is provided, comprising a housing in turn providing an intake housing and a degassing housing.

When a degassing housing is mentioned in general below, this means that not only the outer shell of the housing is meant, but also that said housing functionally comprises a degassing device further described under the term degassing housing, because the spatial and geometric components thereof are also particularly significant.

The housing further comprises at least one housing bore running in part in the interior of the degassing housing and comprising at least one inner wall segment.

The housing bore serves for receiving at least one auger shaft.

The at least one wall segment of the at least one housing bore comprises at least one partition wall protruding into the at least one housing bore in the region of the degassing housing.

Furthermore, at least one filter element is disposed in the interior of the degassing housing and at least partially encompasses the at least one auger shaft, and the outer circumferential surface thereof bears on the previously mentioned partition wall at least in regions, forming at least two spatial regions for generating a fluidic pressure region, wherein the two regions are sealed off from each other.

In a typical design, the screw extruder is an extruder. Therefore, the invention is described below using an extruder, but it is clear that the present invention is not limited to the design of an extruder, but rather comprises any suitable type of transport auger shafts, screw pumps, metering screws, mixers, and the like.

The screw extruder serves for processing bulk material.

Processing in the sense of the present invention is understood to mean the transporting and/or further processing of the bulk material.

Bulk material in the sense of the present invention is understood to be a material in powder form or dust form or granulate form, or material in a solid aggregate state embodied as “chopped” or cut or the like, and material in a fluid, paste, or gel form or comparable aggregate state, wherein mixtures of said various aggregate states are also possible.

Bulk material in the sense of the present invention is sufficiently known in the prior art and therefore does not require further detailed explanation. Merely as an example, it is noted that bulk material can also include suitably processed rubber fed in strip form or optionally as previously comminuted rubber balls.

In one embodiment of the invention, the screw extruder is known as a side feeding machine, that is, a side feeder or side extruder. In a preferred embodiment, the side feeder comprises two auger shafts able to rotate in the same direction or in opposite directions, right-handed or left-handed. Instead of a dual-shaft side feeder, however, a single-shaft side feeder or a multiple-shaft side feeder, also preferred, can be used, that is, a side feeder comprising more than two auger shafts in the sense of the above description. Such a multiple-shaft side feeder can be implemented particularly as a six-shaft or twelve-shaft ring extruder.

The side feeder feeds the bulk material to a main screw extruder, for example a designated main extruder, in turn potentially a single-shaft, dual-shaft, or multiple-shaft extruder, the two or more auger shafts thereof rotating in the same direction or in opposite directions, right-handed or left-handed. The main extruder can particularly be implemented as a ring extruder having six or twelve auger shafts.

The bulk material fed into the main extruder by the side feeder undergoes a change during said process, as is described below in more detail, wherein in any case the bulk material is degassed according to the embodiment of the invention. The bulk material consequently comprises solid material fed into the main extruder. Because the bulk material, as mentioned, also comprises material in a fluid aggregate state, such material is also considered to be solid material in the sense of the present invention.

In one embodiment of the invention, the at least one auger shaft or the at least dual-shaft auger shafts of the side feeder have a constant pitch, so that the auger shafts of the side feeder substantially perform only a transport function.

In another embodiment of the invention, the construction of the side feeder auger shaft(s) is implemented such that further processing can occur in addition to the pure transport function. It is thereby advantageous if the side feeder auger shafts are constructed in segments, that is, if the feeding elements have different auger shaft pitches. The preferably tightly meshing auger shafts can, in said segmented embodiment enabling further processing as described above, comprise a melting zone immediately downstream in the transport direction of the bulk material transport zone implementing the transport function, that is, the auger shafts are preferably implemented as kneading discs or kneading blocks in said region of the melting zone. In the immediately downstream zone, the auger shaft can be implemented such that a pressure increase occurs, at the end of which a discharge nozzle is then connected, for example, by means of which the further processed bulk material or the solid materials are fed into the main screw extruder, such as the main extruder.

The configuration of the auger shafts necessary for said embodiment, that is, particularly the auger shaft pitches thereof, and the implementation thereof partially as kneading discs, kneading blocks, etc., are sufficiently known in the prior art and are therefore not described in further detail.

The screw extruder according to the invention of course comprises an electric motor connected to a gearbox. The previously mentioned auger shaft or shafts are coupled to the gearbox in a known manner.

In addition to the previously mentioned degassing housing and the mentioned intake housing, the housing of the screw extruder advantageously also comprises a connecting housing producing the connection to the further screw extruder, that is, to the main extruder, for example.

The degassing housing is disposed downstream of the intake housing as seen in the process direction.

The intake housing comprises a suitable opening operatively connected to an infeed device by means of which the bulk material is fed into the intake housing. The infeed device can be implemented particularly as a feeding hopper. A metering device having a suitable embodiment can also be connected upstream of the infeed device.

The desired quantity of the bulk material is loaded into the infeed device and fed to the previously mentioned auger shafts through the opening in the intake housing.

The amount of bulk material to be loaded depends on the specific process parameters, that is, the infeed device can be completely or only partially filled, wherein this can be a continuous infeed flow into the intake housing, as long as the overall process of the method is running.

The degassing housing according to the invention is disposed downstream of the intake housing and of the infeed device, in which two regions separated from each other are formed, described in greater detail below, wherein vacuum or a pressurized fluid, such as compressed air, is generated or fed in. Said regions are therefore generally referred to as pressure regions, and particularly as positive pressure regions.

The degassing housing is described first, to the extent that said housing functions as a vacuum housing segment in the sense of the housing of the screw extruder.

The vacuum housing segment comprises one or more vacuum connections at suitable points, in principle disposed arbitrarily. By means of said one or more vacuum connections, the air carried along by the bulk material is extracted. The extraction is referred to below as degassing or venting. Said procedure of extracting, however, is not limited to air, but can comprise any fluid. For simplicity, however, air is described below.

By extracting air, the transportability and processability of the bulk material is substantially improved.

The vacuum is provided in the interior of the degassing housing, in which a segment of the auger shaft runs.

Regardless of the units of measure used for describing a vacuum, such as Pa or bar, in the sense of the present invention a vacuum is understood to be a state in a space wherein the air pressure in said space is below that of the atmosphere. Vacuum in the sense of the present invention can be a low vacuum, medium vacuum, high vacuum, or ultrahigh vacuum.

The inner wall segment of the vacuum housing segment of the degassing housing partially bounding the at least one housing bore can be connected to the vacuum connections by means of channels or other suitable design means.

The positioning of the degassing housing and therefore the extraction is between the infeed device for the bulk material and the main screw extruder, as seen in the transport direction of the side feeder auger shafts. Therefore, the extraction is a forward venting and not a reverse venting.

For the purpose of extracting the air carried along by the bulk material by means of the at least one vacuum connection, at least one filter element is disposed between the inner wall segment partially bounding the at least one housing bore and the auger shaft(s) running in said at least one housing bore. Said filter element is described below. Said filter element serves for limiting the extraction effect to the air or fluid to be extracted and for not otherwise influencing the bulk material.

Said at least one filter element is disposed between the inner wall segment of the degassing housing and the auger shaft or shafts. Said element is implemented such that part of the bulk material can indeed be suctioned by applying the vacuum, but is largely retained by the filter element, that is, is not also extracted, so that said material is further available for further transport or further processing by the auger shaft(s).

At least one vacuum connection is preferably provided per filter element. The positioning of the at least one filter element correspond to the position of the design components by means of which the extracting of the air carried along by the bulk material is performed.

The degassing housing and the filter disposed in the degassing housing are therefore located at the same place, that is, downstream of the infeed device in the processing direction and in the intake zone.

Depending on whether one or more housing bores are provided, the shape of the at least one filter element can be partially circular, wherein for a dual-shaft side extruder a wing-shaped configuration of the filter element may result, as said element then encompasses two auger shafts. A different shape than a partially circular shape can also be selected.

The at least one filter element can be recessed by a gap relative to the inner wall of the housing of the screw extruder. The gap can have an arbitrary width. Whether a larger or smaller, particularly minimal, gap is selected depends in part on the processing parameters. The filter element can, however, also be flush with the inner surface of the housing. If the filter element is recessed by a defined gap, then it can be possible for what is known as a filter cake to form.

If the inner wall of the degassing housing is designed as a partial circular ring as a result, then the forming of a gap also means that the filter element is recessed by a partially circular ring cross section, wherein the gap can preferably have a constant spacing or a variable spacing. The gap spacing is thereby preferably at least 0.90 mm to 1.60 mm, further preferably between 1.6 mm and 1.7 mm, and further preferably 1.70 mm to 2.0 mm. Said gap can, however, as indicated, also have different dimensions, particularly implemented as a larger gap.

As indicated, the gap need not have a constant thickness and can therefore merely be similar to a partially circular ring cross section. The person skilled in the art is not, however, bound in this respect. He can be guided, for example, to keep the thickness nearly constant or constant when the thickness is relatively small. For a greater gap with, he may potentially see the uniformity of the gap width as somewhat less significant. For the previously mentioned dimensions of the gap widths, he would more likely try to keep the gap width constant.

In a particularly preferred embodiment of the invention, the filter element is implemented as an inliner, enclosing the at least one or the two or more side feeder auger shafts about the entire circumference thereof. Said filter inliner is therefore located in the housing bore passing through the degassing housing. Said filter is thus present in the intermediate space between the side feeder auger shaft or shafts and the inner wall segment of the degassing housing.

It is particularly preferable if the filter inliner is interchangeably retained in the bore of the degassing housing.

The vacuum is applied in both the circumferential direction and in the axial direction, for example by means of channels, holes, or correspondingly implemented perforations within the wall of the degassing housing, and/or compressed air is fed to the outside of the filter inliner, as described further below.

The filter inliner can thus be similar in shape to a horizontal numeral eight, for example, in a front view of a dual-shaft side feeder.

A partition wall at the inner wall of the housing bore running in the degassing housing bounds the vacuum from being transmitted further in the circumferential direction, so that two regions separated from each other are produced. Vacuum or compressed air is connected to the housing from above or below, by means of one channel, bore, or perforation each.

The at least one partition wall, each bounding the inner wall of the at least one housing bore, can thereby be disposed at approximately the three-o'clock position and nine-o'clock position of the inner wall of the housing bore, and runs continuously along said wall in a defined region of the degassing housing.

If, for example, one vacuum connection is thus provided at each of the top side and the bottom side of the degassing housing, then vacuum or compressed air can be connected to the housing from above or from below, by means of one channel, bore, or perforation each.

To this end, the filter element, particularly the filter inliner, is disposed on the at least one partition wall such that a tongue-and-groove arrangement is produced between the filter element, particularly the filter inliner, and the partition wall, or that the filter inliner otherwise makes sealing, direct or indirect contact with the partition wall. Due to the continuous, that is, not penetrated extent of the partition wall on the inner wall of the housing bore, and the connecting arrangement to the filter element, particularly to the filter inliner, a sealing arrangement arises and interacts with said inner wall and the outer surface of the filter element or filter inliner, spatially and functionally bounding the pressure regions from each other. The filter inliner is thereby preferably implemented such that said inliner comprises a groove-shaped recess running axially along the side partition wall. In this manner, the filter element, particularly the filter inliner, can be pulled out of the degassing housing as an entire component in a simple manner, as needed, and replaced therein, for example by pushing in.

It is also possible, of course, to provide the inverse shape design with respect to the mutual arrangement of the partition wall, the filter inliner, and the vacuum connections.

The entire arrangement can therefore be designed such that one single vacuum region or positive pressure region is implemented. However, two or more pressure regions can also be defined.

It is particularly advantageous if not only each pressure region described above can not only have vacuum applied thereto, but rather if each filter element or the corresponding filter side of a filter inliner can also have a fluid, such as compressed air, applied thereto, in order to backflush the filter opposite the direction of suction.

Each vacuum region can thereby be associated one or more compressed air backflushing connections. One such multiple division appears to be particularly sensible for a ring extruder embodiment, due to the large extent of the inner housing.

It is possible by design to feed in compressed air for backflushing through one further bore provided in the degassing housing for each, for example at the top and bottom.

Of course, other design options are also conceivable in this respect. For further simplifying the design of the degassing housing, it can be provided that the backflushing of the filter also occurs by means of the vacuum connections themselves. Additional connecting holes in the housing can thereby be eliminated. A valve present in the corresponding vacuum line is then closed for backflushing, for example. Typical valves, such as ball valves, solenoid valves, or gate valves, can be provided for this purpose and actuated manually, electromagnetically, or by motor power, and actuated by an automated controller. The compressed air can then be activated by means of an additional connection in the vacuum line between the housing and the shutoff valve.

By providing at least one spatial region between the inner wall of the degassing housing and the (preferable) filter inliner, a vacuum can also be produced in a simple manner according to the invention, by means of which the fluid, such as air, carried along by the bulk material is extracted. Said embodiment further enables flushing of the filter. The method of operating can thereby be such that, for at least two provided pressure regions, one of said regions has vacuum applied while the other region is backflushed, and vice versa. It is also possible, of course, to apply vacuum or compressed air to each of the two (or more) pressure regions alternately by means of only one hole.

Depending on the filter material selected and the thickness thereof, further supporting walls can be integrated in the degassing housing, not for separating the vacuum region but rather for improving the mechanical stability of the filter.

Such additional support ridges can be disposed at the inner wall of the housing bore in the region of the degassing housing, at the six-o'clock and twelve-o'clock positions, for example. In such a case, therefore, with two side partition walls, a total of four walls would be present at the inner wall of the housing bore for multidimensionally supporting the filter element, preferably the filter inliner, and for producing at least two pressure regions bounded from each other.

Inverse design options are also possible in this respect.

In contrast to the two side partition walls sealing off the pressure regions from each other, the support ridges disposed at the top and bottom, for example, and also running in the longitudinal direction, have penetrations. Said penetrations can open into channels or holes of the vacuum connections. The vacuum or compressed air can propagate through the penetrations laterally to the partition walls. Due to the penetrations, the additional support ridges thus do not bring about any additional number of pressure regions.

For installing and removing the filter inliner or the filter element, constructed as a multipart or single component, the degassing housing can be constructed in three parts, that is, a middle part receive the vacuum connections and any further water connections, and a front housing end piece and rear housing end piece at the front and rear ends thereof. The filter is then changed out by disassembling the side feeder.

It is, however, further possible to simplify the design, such that the degassing housing is implemented only as a single part. By means of suitable connecting mechanisms for connecting to the intake housing and the connecting housing, the degassing housing can then be removed from the screw extruder in a simple manner as needed. The filter inliner or the filter element is thereby easily accessible and can be replaced with a different filter inliner or a different filter element in a simple manner.

A substantial advantage of the design described above with respect to the prior art is that, relative to the overall length, that is, the length of the side feeder housing or the main screw extruder, a substantially larger filter area can be implemented. By producing two or more pressure regions, such as in the form of a top pressure region and a bottom pressure region, particularly when the vacuum connections are positioned accordingly, a particularly effective degassing method can be provided.

The filter area can be enlarged nearly arbitrarily in this manner, in that the filter element or filter inliner is simply lengthened. It is even possible in principle to implement the lengthening such that the filter element or filter inliner extends past the end face(s) of the degassing housing in the longitudinal direction and protrudes into the intake housing or the connecting housing.

The filter area that can be implemented in comparison to the overall length also makes it possible to reduce the number of different filter types depending on the bulk material being processed, so that the overall costs of the system can be reduced. This also results in lower inventory costs and storage costs for the relevant filters.

It further follows from the above that the invention is suitable not only for screw extruders of the side feeder type, but also can eb used for other screw extruders, such as for main extruders, regardless of whether said extruders are single auger shaft extruders, dual auger shaft extruders, multiple auger shaft extruders, or ring extruders.

In a further preferred embodiment of the invention, the degassing housing in which the filter inliner is installed can be cooled by means of air or by means of a fluid, preferably water. To this end, at least one water connection is provided for cooling the housing.

It is also equally possible, however, to integrate cooling bores directly in the filter inliner, so that the filter itself is cooled. The cooling bores can thereby be sealed off by a type of coating.

Alternatively, the cooling bores can be produced in the first step when producing the inliner. The filter material is then coated, so that the filter pores within the cooling bores are closed off. The outer and inner contour of the inliner are then machined. In said step the coating is removed, so that the pores at the surface are opened again. In this manner, the permeability of the filter is produced and sealed cooling bores are also produced.

When selecting the filter fineness, the person skilled in the art is free to determine the same depending on the bulk material being processed and the duration of the processing. In general, pore diameters in the range of about 5 p to about 100 p have been found to be suitable for the filter fineness.

The person skilled in the art is also principally not limited in the selection of the filter material.

However, filter material made of or comprising porous metal and resembling a compact, solid body is preferably used. It is further preferable to produce the filter material from porous metal, not in a sintering process. A filter material made of porous metal produced in a sintering process is also possible, of course.

Materials such as non-wovens, weaves, fabrics, and granulates of the various materials are further suitable, as described in more detail below.

A metal powder or aluminum powder processed with a binder is suitable as a material for the filter, comprising a very fine to good surface structure, depending on the pore size. By machining, such as polishing, the surface can be produced having the desired dimensions.

Steel or chromium steel powder processed with a binder and having the previously mentioned properties is further suitable as a material.

A product made of mineral particles and processed with a binder is further suitable as a material.

In addition, a porous cast resin body filled with metal can also be used as a filter material.

The overall porosity of the filter element or filter inliner is based on the processing parameters in each case, such as the bulk material being processed. The porosity is therefore at the discretion of the person skilled in the art. The porosity can exceed a value of 20%, for example.

The person skilled in the art is also not bound with respect to the density, hardness, or long-term temperature durability of the material in the context of the present invention, and is free to select suitable parameters.

It is particularly preferable to select a filter material produced by means of additive manufacturing, laser sintering, or industrial 3D printing, made of ceramic, metal, plastic, aluminum, etc.

Additive manufacturing thereby refers to a method wherein a component is built up in layers by placing material on the basis of digital 3D design data. A particularly miniaturized porosity of the filter can be achieved by additive manufacturing. A product produced in this manner in the micron range can withstand high long-term loads. A further advantage of additive manufacturing is that, if desired, complex geometries can also be worked into the filter, such as cooling bores, manifold channels for vacuum and compressed air, grooves for seals, mounting threads, and the like.

In addition, the pore size of the filter can also be influenced by means of additive manufacturing. It is thereby particularly advantageous to minimize the pressure loss due to applying the vacuum or positive pressure, which can never be entirely eliminated, by producing very small pores on the inside of the filter, becoming ever larger toward the outside. Inverse configurations are also possible.

As is already provided in the prior art, such as in DE 10 2013 208 993 B4, it is possible to provide a protective element for the at least one filter element or filter inliner, without thereby requiring subdivision into a plurality of protected regions.

The advantages of the invention described above are manifold:

It is possible to apply the technology of extraction, filtration, and pressurization directly to a main screw extruder.

The filter inliner described above can also be used in what is known as a stuffer, used not for material feeding but for degassing. In some processes, it can occur that material escapes in the region of degassing. This can be prevented by the additional filter.

As previously addressed, a very large filter area can be implemented. This is particularly advantageous when processing powders having very small particle size, as a high filter fineness is required to this end. The smaller the pore size of the filter, the stronger the applied vacuum must be. A large filter area can counteract this effect. Influence on the filter area is provided by increasing the length of the inliner.

It further follows from the above that the construction is quite simple, as only a few components are required. Complicated mounting of the filter is not necessary. This results in an overall inexpensive production The design is also robust.

As indicated, the invention also enables venting, that is, degassing. It is not, however, limited thereto, but rather suitable for fluids in general.

One such fluid can be water vapor, for example. Such a fluid can arise, for example, if high temperatures arise as a result of transporting or further processing the bulk material. If the bulk material contains moisture, then water vapor can arise therefrom, and can be extracted by means of the technology of the invention in the same manner as described above.

The mechanical stability enables additional applications, in the form of mechanical pressing of fluids, particularly water. The material being processed, preferably rubber, is thereby compressed in the auger shafts by a return feeding arrangement in the auger shaft configuration, or by the flow resistance of an extrusion die (die backpressure). The fluid thereby escapes the material and is then drained off by means of the filter, or can be extracted. Mechanical pressing of fluids is described in EP 1 400 337 BI, for example.

A further advantage of the invention is the great flexibility of the design. The use of a wide range of filter materials can be realized in a simple manner. In this manner, the type of filtration can also be selected, for example what is known as surface filtration or deep filtration.

The thickness of the filter can also be easily adapted to the particular process for the bulk material, whereby it is also possible to reduce the vacuum required. It can be assumed that a filter having a high filter fineness is less permeable and thus a greater vacuum is required. A correspondingly small filter wall thickness counteracts the problem.

SUMMARY

Operation of the screw extruder can be summarized as follows:

By means of a metering device optionally connected upstream of the infeed device, such as a gravimetric metering device, the bulk material is fed into the screw extruder by means of the infeed device. The bulk material can be powder, dust, granulate, or in some other suitable state. For example, polymer granulate or rubber granulate can be processed, as can powdered fillers or additives. In order to improve the intake behavior of the screw extruder, the bulk material is degassed by means of the degassing device of the degassing housing. To this end, a vacuum is generated by means of connections for vacuum and arise in a sealed region between the inner wall of the degassing housing and the filter element or filter inliner, that is, in the pressure region, by extracting air and/or gas from the bulk material.

The powdered, granulated, or other bulk material is retained by the filter element or filter inliner, so that the actual bulk material is transported onward by the rotating auger shafts and transferred into an optionally present melting zone or pressure buildup zone and processed there, then discharged by means of a discharge nozzle, for example, into the main screw extruder.

The fineness of the filter is thereby selected such that fluid, such as air and/or gas, can be extracted from the bulk material, but that the actual bulk material cannot pass through the corresponding configuration of the filter openings, so that said material is accessible for the further transport and further processing described above.

The operation of the screw extruder system is not limited to producing a vacuum, however; rather, compressed air backflushing of the filter, that is, for cleaning the filter, can also be fed into the pressure regions described above.

The vacuum or compressed air is guided by means of channels or holes within the housing in the circumferential direction and in the axial direction to the outside of the filter element or filter inliner.

Because a laterally bounding wall is disposed at each side on the inside of the wall of the degassing housing, the propagating of the vacuum or compressed air is limited in the circumferential direction, so that two regions separated from each other are produced. The vacuum or compressed air is thereby preferably fed into the degassing housing through a hole.

The method of operation can thereby be that the vacuum regions and pressure regions have vacuum applied alternately, and the other region can be backflushed correspondingly. It is also possible, however, to operate each of the two vacuum regions or pressure regions by means of only one hole, alternately applying vacuum or compressed air.

The system can be designed such that one single vacuum region is implemented. Alternatively, two or more vacuum regions or pressure regions can be defined. The vacuum regions or pressure regions have vacuum applied separately by means of the vacuum connections. Compressed air can be fed in particularly through separate backflushing connections, or the vacuum connection can be used for this purpose.

To this end, one further hole each, for example at the top and bottom, can be used for connecting compressed air for backflushing.

Each pressure region of each filter element can have compressed air applied, in order to backflush the filter opposite the suction direction.

If the backflushing of the filter is provided by means of the vacuum connections for further simplifying the degassing housing, then a valve present in the corresponding vacuum line is closed for backflushing. The compressed air is then activated by means of an additional connection in the vacuum line between the housing the shutoff valve.

BRIEF DESCRIPTION OF THE DRAWINGS

The invention is described in further detail by means of two embodiment examples, to which the invention is not limited, of course. Shown are.

DETAILED DESCRIPTION

Figure 1:
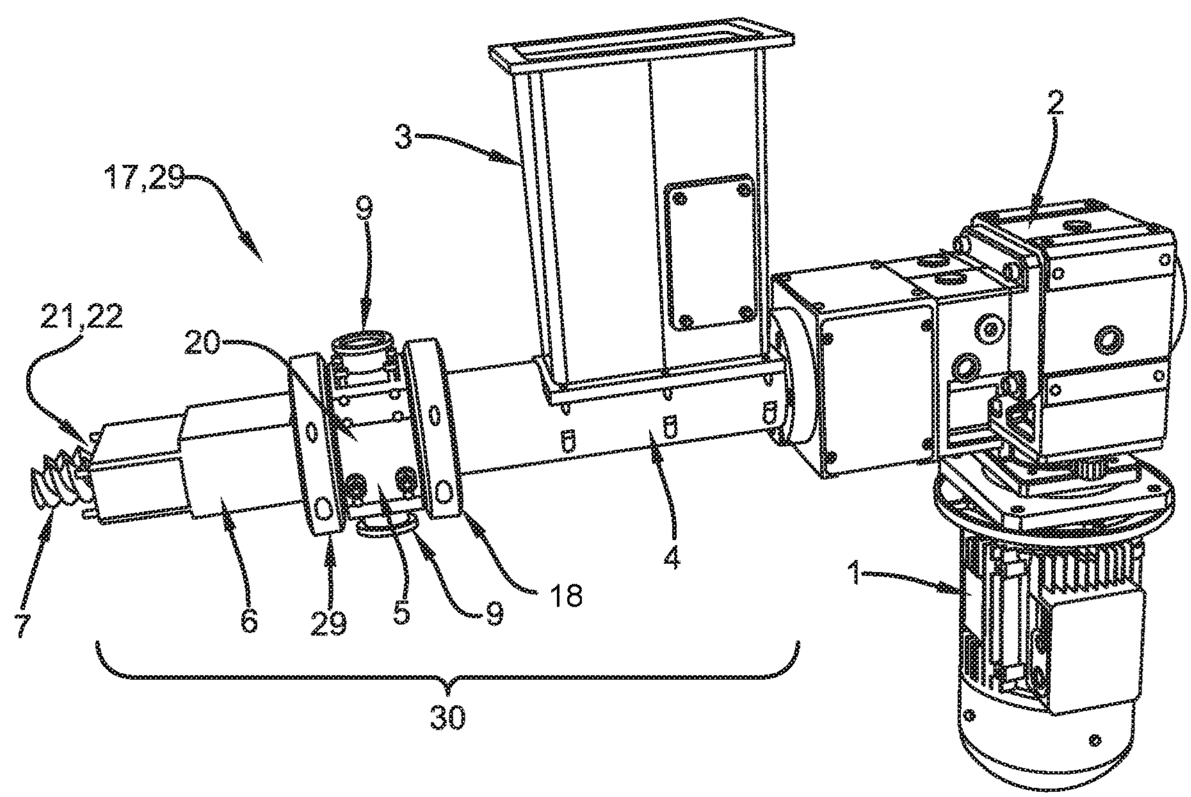
FIG. 1; a side feeder having a degassing housing.

FIG. 1 shows a side feeder 17 driving at least two auger shafts 7 by means of a motor 1 and a gearbox 2. The intake housing 4 is disposed immediately downstream of the gearbox in the flow direction and receives the material to be processed, namely the bulk material (not shown), by means of the infeed device 3. The infeed device 3 is disposed on the top side of the intake housing. To this end, the intake housing 4 has an opening, not shown.

The screw extruder 29 in the side feeder 17 embodiment thereby comprises a housing 30 comprising, in addition to the intake housing 4 mentioned above, the degassing housing 5 and the connecting housing 6. The latter provides the connection of the further main screw extruder, particularly the main extruder, not shown.

Because the side feeder 17 in the present embodiment example is implemented as a dual-shaft screw extruder, the housing comprises two continuous housing bores 21, 22, as indicated in FIG. 1. The auger shaft housing bores 21 and 22 receive the auger shafts 7 rotating either in the same direction or in opposite directions in said housing bores.

The degassing housing 5 can be constructed as a single part or multiple parts. Said housing thereby comprises a housing base body 20 to which a front housing end piece 18 and a rear housing end piece 19 are connected. At the top side and bottom side of the housing base body 20, one connection 9 each for vacuum can also be seen, and can also simultaneously be a connection for compressed air for backflushing the filter element according to the general explanation.

The bulk material fed into the intake housing 4 by means of the infeed device 3 is transported by the auger shafts 7 in the direction of the main screw extruder. If the auger shafts are simply implemented as transport auger shafts, then only the transport process occurs. However, a kneading disc segment and in turn a second transport auger shaft segment, not shown, can be adjacent to the first transport auger shaft segment in the region of the intake housing 4, and a further segment can be adjacent thereto and bring about a pressure increase prior to discharging the bulk material into the main screw extruder. Different auger shaft pitches bring about either pure transporting of the bulk material or the pressure increase. Pre-processing of the bulk material can be performed by means of the kneading disc segment, in that the bulk material is melted and/or homogenized there, depending on the consistency thereof. For the case of rubber processing, mastication or premastication of the bulk material can also occur.

Figure 2:
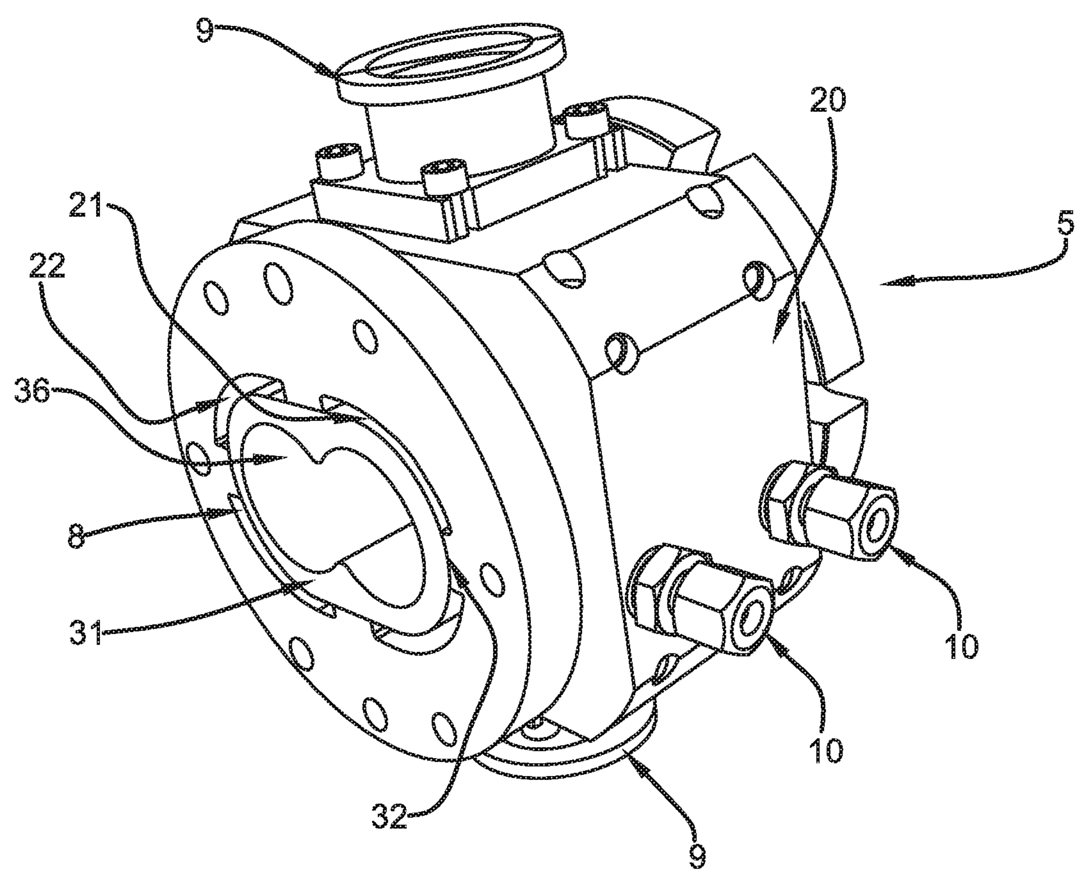
FIG. 2: a degassing housing according to FIG. 1 having a filter inliner.

FIG. 2 shows a detailed view of the degassing housing 5 according to FIG. 1 having the filter element 8 interchangeably inserted, for example pushed, into the housing bores 21 and 22 in the specific embodiment as a filter inliner 31. The inner region of the filter inliner 31 is implemented as a horizontal numeral eight and receives the two auger shafts 7 (not shown). The two connections 9 disposed above and below the housing base body 20 of the degassing housing 5 are provided for providing vacuum or compressed air. The two water connections 10 allow cooling of the housing 5.

Figure 3:
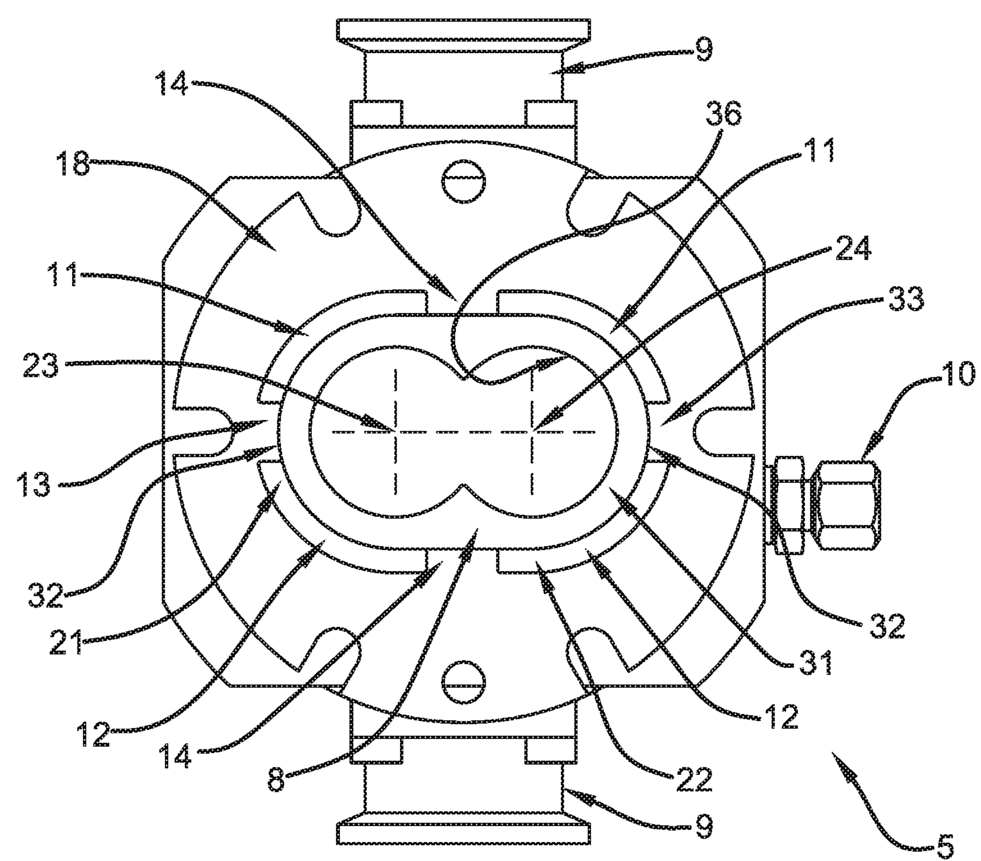
FIG. 3: the front view of the degassing housing having a filter inliner.

FIG. 3 shows the front view of the degassing housing 5 having the filter element 8/filter inliner 31. The two connections 9 for vacuum or compressed air are disposed at the top and bottom, at the positions of six o'clock and twelve o'clock, of the degassing housing 5. The water connection 10 for cooling the housing is present at approximately the four-o'clock position.

Figure 4:
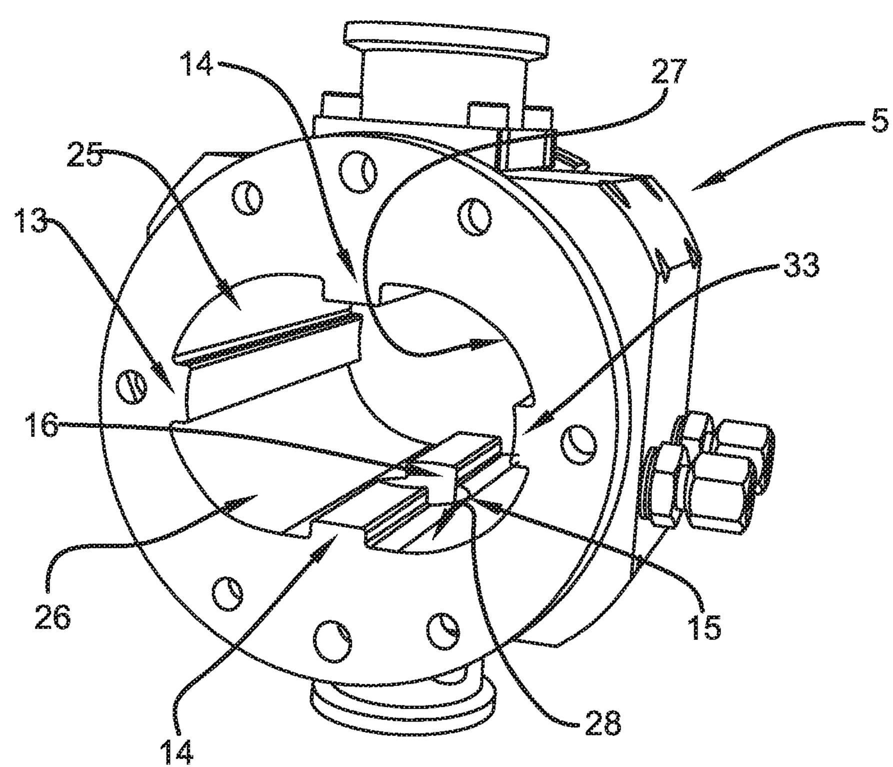
FIG. 4: the degassing housing without filter-inliner.

The design of the housing 5 is shown in the front view of the front housing end piece 18. The axes of rotation 23, 24 of the two auger shafts 7 not shown are enclosed by the filter element 8 implemented as a filter inliner 31. The auger shafts and the filter inliner 31 are received in the housing bores 21, 22 of the screw extruder. The degassing housing 5 thereby implements inner wall segments 25, 26, 27, and 28 shown in FIG. 4. Said inner wall segments are bounded laterally by two walls 13, 33, as shown in FIG. 3 and FIG. 4, disposed in the present embodiment examples at the 3-o'clock and 9-o'clock positions of the housing bores 21 and 22. Because the walls 13, 33, as shown in FIG. 4, run substantially over the length of the inner wall segments 25-28 of the degassing housing 5 without interruption, and because the filter inliner 31 is installed in the housing bores 21 and 22 such that said inliner bears upon the lateral walls 13, 33, a top pressure region 11 and a bottom pressure region 12 are formed and are separated from each other by the lateral walls 13, 33. The pressure regions 11 and 12 function as vacuum regions when vacuum is applied thereto, and as positive pressure regions when compressed air is applied for backflushing. The vacuum or pressure arising from connecting the vacuum or compressed air can thus not be propagated from the top pressure region 11 into the bottom pressure region 12, and vice versa, due to the walls 13, 33, so that said two pressure regions 11 and 12 are regions separated from each other and sealed off from each other. Vacuum or compressed air is connected to the degassing housing 5 by means of the connections 9 disposed at the top and bottom for vacuum and compressed air through one hole 15 each at the top and bottom (top hole not shown).

The method of operation is that the two vacuum regions have vacuum applied alternately, such that the other region can be backflushed correspondingly. In the present embodiment, operation thus takes place such that pressure region 11 or 12 is associated with a vacuum connection or a compressed air connection. In the embodiment shown, the vacuum connection and the compressed air connection are each comprised in the connection 9. It is also possible to provide separate compressed air connections, not shown, for use as necessary depending on the bulk material to be processed. The air carried along by the bulk material is therefore extracted by means of the two vacuum connections 9. A vacuum thus arises in the top and bottom regions 11 and 12. At the same time, said regions can also have compressed air applied, however, in order to backflush the filter inliner 31 opposite the suction direction.

The filter inliner 31 is mounted interchangeably. The outer circumferential surface of the filter inliner is labeled as 32. The inner surface of the filter inliner is labeled as 36.

The vacuum or compressed air is guided by means of holes 15 and/or channels, not shown, within the housing in the circumferential direction and in the axial direction to the outside of the filter inliner 31.

As can be seen in FIG. 3 and FIG. 4, depending on the selected filter material and the thickness thereof, additional support ridges 14 are integrated in the housing. Said walls, however, as can be seen in FIG. 4, each have an interruption 16 for laterally propagating vacuum or compressed air. This means that the support ridges 14, unlike the two lateral partition walls 13, 33 sealing off the vacuum regions from each other, have penetrations for lining up with the holes of the vacuum connections, so that the vacuum can propagate laterally to the partition walls 13, 33. The through hole of the vacuum connections is labeled with reference numeral 15 as an example in FIG. 4.

Figure 5:
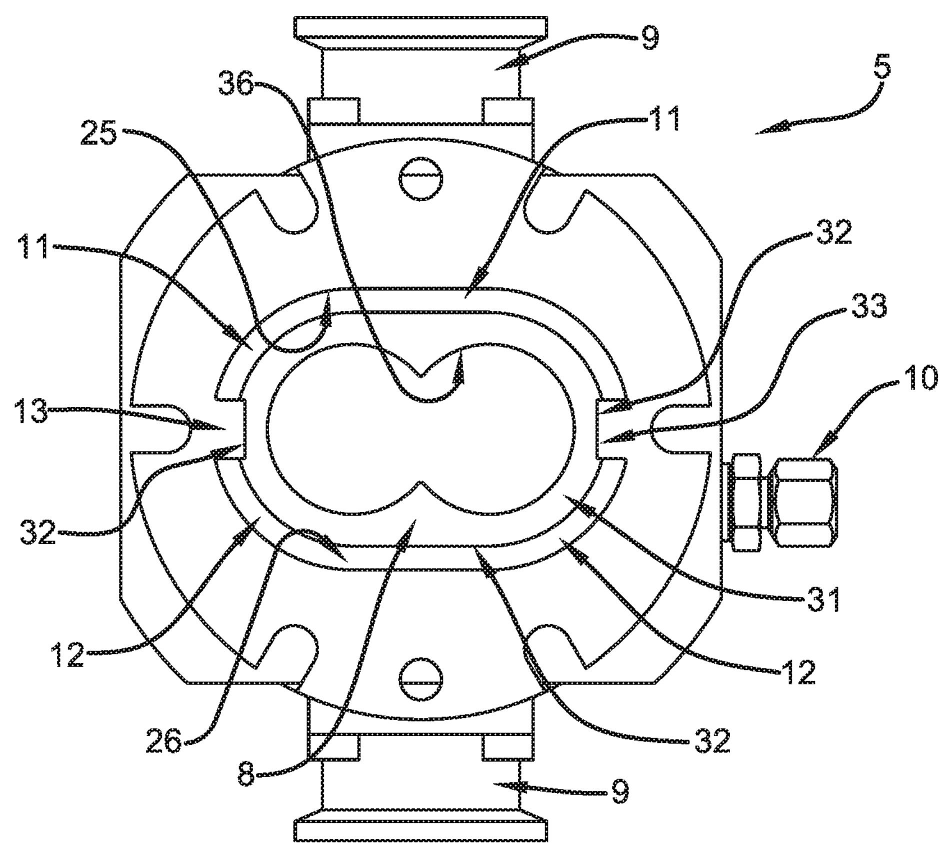
FIG. 5: a variant of the degassing housing without support ridges for maximizing the filter area.

FIG. 5 shows the embodiment of the filer inliner 31 inserted in the housing bores 21, 22 shown in FIG. 3, FIG. 4. In the present embodiment, the outer circumferential surface 32 of said filter inliner 31 thereby encloses the lateral partition walls 13, 33, whereby the sealing separation between the top pressure region 11 and the bottom pressure region 12 is implemented. The embodiment according to FIG. 5 is thereby differentiated from the embodiments according to FIG. 3 and FIG. 4 in that the inner wall of the degassing housing 5 comprises no additional support ridges, so that in the present embodiment two separate pressure regions 11 and 12 sealed off from each other are formed by the outer circumferential surface 32 of the filter inliner 31 and the inner walls 25 and 26 of the degassing housing 5 and the side walls 13 and 33.

Figure 6:
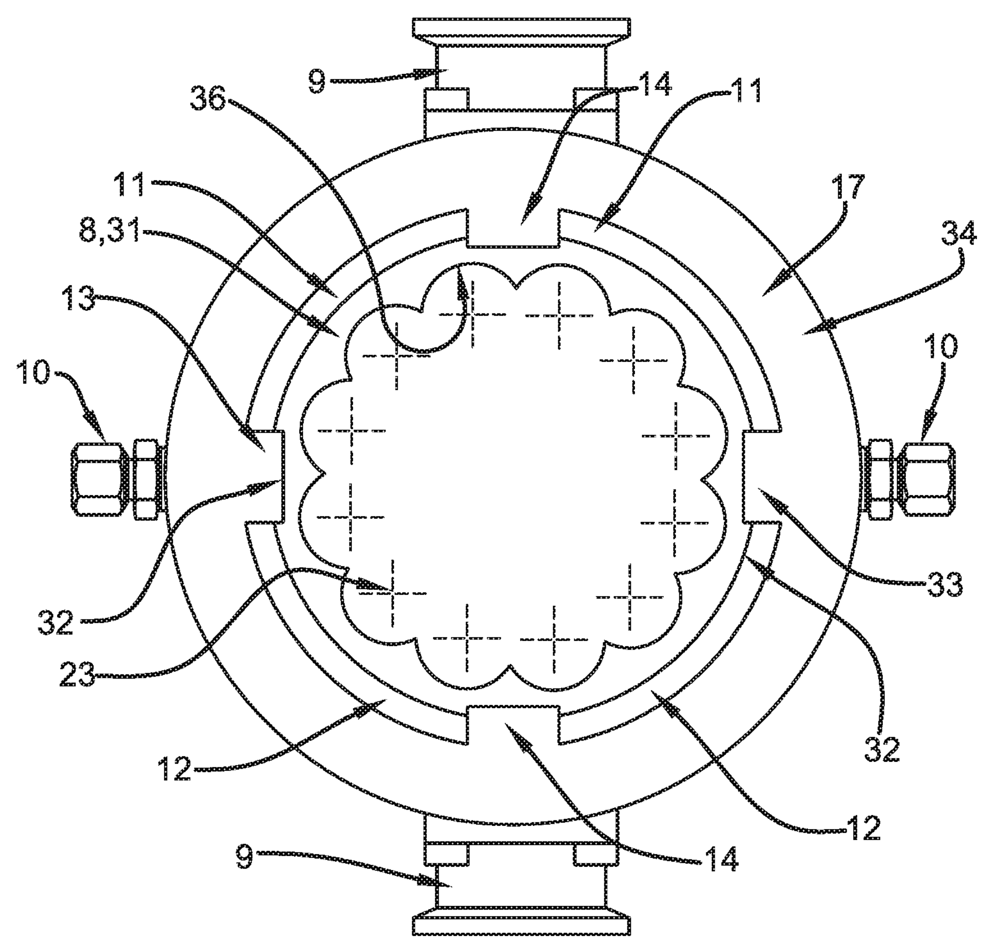
FIG. 6: a degassing housing of a ring extruder having a filter inliner.

The embodiment example shown in FIG. 6 thereby principally corresponds to the embodiment example shown in FIG. 3 and FIG. 4, with the difference that at least one housing bore 21 receives a twelve-shaft ring extruder 34—in the present example—in turn enclosed by a filter element 8 implemented as a filter inliner 31 and forming a top vacuum region 11 and a bottom vacuum region in part due to the lateral walls 13, 33. The two lateral partition walls 13, 33 seal off the vacuum regions 11 and 12 from each other. In contrast thereto, the support ridges 14 also provided at the top and bottom are penetrated by holes of the vacuum connection (not shown), so that the vacuum or compressed air can propagate laterally to the partition walls 13, 33 in the vacuum regions 11 and 12. In the present embodiment example as well, the filter element 8 is interchangeably received in the housing bore 21 as the embodiment of a filter inliner 31 and is fixed by the lateral walls 13, 33 and the partition wall 14.

Figure 7:
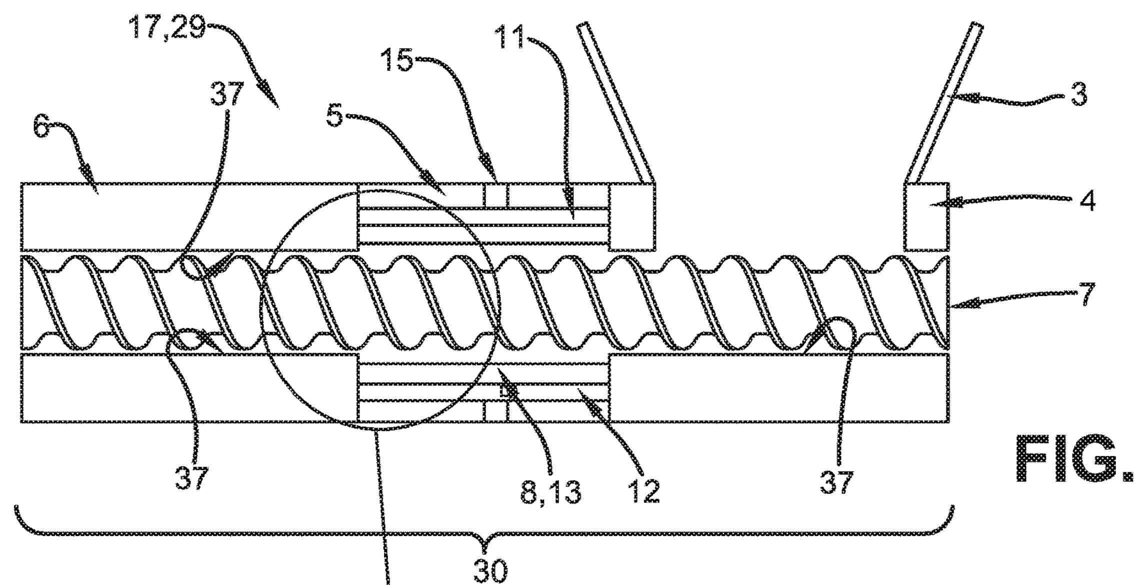
FIG. 7, 7*a*: a side view (FIG. 7) showing the gap by which the filter element is recessed relative to the inner wall of the housing, together with a detail view (FIG. 7*a*).
Figure 7A:
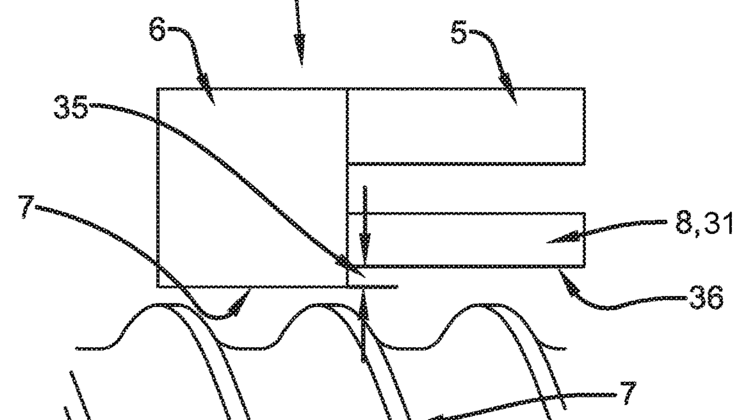
Figure 7A:
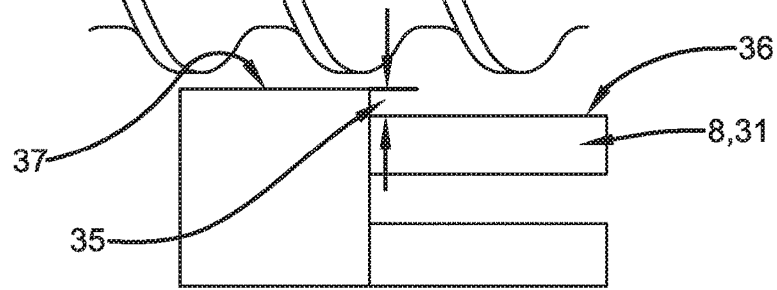

FIGS. 7 and 7*a* show the embodiment of the gap 35 by which the filter inliner 31 is recessed relative to the inner surface 37 of the housing 30. A somewhat greater intermediate space thereby arises between the auger shaft 7 and the inner surface of the filter inliner 36. The enlarged intermediate space allows the formation of the "filter cake" referred to.

In the embodiment examples shown, the air carried along by the bulk material is exhausted by means of one or more vacuum connections. The filters provided prevent part of the bulk material from being extracted as well. The extraction is positioned between the infeed device 3 for the bulk material and the main screw extruder in the transport direction of the side feeder auger shafts. This is a forward ventilation in this respect. The degassing housing in which the filter element is installed is present downstream, that is, after the infeed device 3 in the intake zone of the intake housing 4. The embodiment examples shown show the embodiment implementing the filter element 8 as a filter inliner 31 enclosing the two side feeder auger shafts 7 along the entire circumference and located in the housing 30 of the side feeder. The filter inliner 31 is mounted interchangeably in the housing bore 21, 22. The vacuum or compressed air is guided by means of holes and/or channels within the housing in the circumferential direction and in the axial direction to the outside 32 of the filter inliner 31. A wall 13, 33 limits the propagation of the vacuum in the circumferential direction on each side, so that two pressure regions 11, 12 separated from each other are formed. Vacuum and compressed air are connected to the housing by means of one hole 15 each at the top and bottom. Compressed air is applied to the filter element in the regions 11 and 12 thereof, so that the filter can be backflushed opposite the suction direction.

REFERENCE LIST

1 Motor
2 Gearbox
3 Infeed device
4 Intake housing
5 Degassing housing
6 Connecting housing
7 Auger shaft
8 Filter element

9 Connections for vacuum and compressed air
10 Water connections for housing cooling
11 Top pressure region for vacuum or positive pressure
12 Bottom pressure region for vacuum or positive pressure
13 Partition wall for separating the pressure regions 11, 12
14 Support ridge for mechanical stabilization
15 Through hole to vacuum connection
16 Interruption of the support ridge for lateral passage of vacuum and compressed air
17 Side feeder
18 Front housing end piece
19 Rear housing end piece
20 Housing base body
21 Housing bore
22 Housing bore
23 Axis of rotation
24 Axis of rotation
25 Inner wall segment of the degassing housing
26 Inner wall segment of the degassing housing
27 Inner wall segment of the degassing housing
28 Inner wall segment of the degassing housing
29 Auger machine
30 Housing
31 Filter inliner
32 Outer circumferential surface of filter inliner
33 (Additional) partition wall
34 Ring extruder degassing housing
35 Gap
36 Inner surface of filter element 8, 31
37 Inner surface of housing 30

The invention claimed is:

1. A screw extruder having a housing comprising:
an intake housing,
a degassing housing, and
at least one housing bore running through the interior of the degassing housing, the housing bore defined by at least one inner wall segment of the degassing housing, the housing bore configured to receive at least one auger shaft,
wherein the at least one wall segment of the at least one housing bore comprises at least one partition wall protruding into the at least one housing bore, in the region of the degassing housing,
wherein at least one filter element is disposed in the interior of the degassing housing, operably at least partially enclosing the at least one auger shaft and contacting the at least one partition wall, the at least one filter element defining at least two spatial pressure regions sealed off from each other; and
wherein the filter element comprises a filter inliner, wherein the filter inliner encloses the at least one auger shaft about the entire circumference thereof, wherein the filter inliner is installed in the housing bore such that the filter inliner bears upon the at least one partition wall.

2. The screw extruder according to claim 1, characterized in that the degassing housing comprises at least one connection for feeding in or extracting vacuum and/or compressed air.

3. The screw extruder according to claim 1, characterized in that the respective pressure regions are configured for receiving vacuum and/or atmospheric positive pressure.

4. The screw extruder according to claim 1, characterized in that the screw extruder is implemented as a side flow feeding machine.

5. The screw extruder according to claim 4, characterized in that the side flow feeding machine is implemented for feeding bulk material to a main screw extruder.

6. The screw extruder according to claim 5, comprising a main screw extruder that comprises one or more auger shafts or a ring extruder.

7. The screw extruder according to claim 4, characterized in that the screw extruder comprises two auger shafts.

8. The screw extruder according to claim 1, characterized in that the at least one inner wall segment defining the at least one housing bore comprises at least two partition walls spaced apart and protruding into the at least one housing bore in the region of the degassing housing, and the at least one filter element selectably bears upon the at least two partition walls.

9. The screw extruder according to claim 1, characterized in that the at least one filter element comprises a filter inliner.

10. The screw extruder according to claim 9, characterized in that the filter inliner is implemented for operably encompassing the at least one auger shaft about the entire circumference.

11. The screw extruder according to claim 8, characterized in that the housing bore defined by at least two inner wall segments of the degassing housing that are separated by at least one supporting wall protruding into the at least one housing bore.

12. The screw extruder according to claim 1, characterized in that the degassing housing comprises at least one water connection for cooling the housing.

13. The screw extruder according to claim 1, characterized in that the filter element comprises cooling holes.

14. The screw extruder according to claim 1, characterized in that the filter element comprises porous metal filter material.

15. The screw extruder according to claim 1, characterized in that the filter element comprises filter material comprised of non-wovens, weaves, fabrics, or granulates as materials.

16. The screw extruder according to claim 1, characterized in that the material of the filter element is produced from ceramic, metal, or plastic by means of additive manufacturing.

17. A method for processing bulk material comprising the following steps:
providing a screw extruder the screw extruder comprising:
a housing, having at least one housing bore disposed in the housing,
at least one auger shaft rotationally driven about a corresponding axis of rotation and disposed in the housing bore,
an infeed device for feeding the bulk material into an intake housing, and
a degassing housing comprising: at least one connection for use as a vacuum line or compressed air line, and a filter element, and the degassing housing having at least two different pressure regions defined by at least one partition wall that separates the at least two different pressure regions;
wherein the filter element comprises a filter inliner, wherein the filter inliner encloses the at least one auger shaft about the entire circumference thereof, wherein the filter inliner is installed in the housing bore such that the filter inliner bears upon the at least one partition wall feeding bulk material through the infeed device and into the at least one housing bore by means of the infeed device;

further transporting the bulk material from the intake housing in the direction of the degassing housing for one of: degassing the infed bulk material, or pressurizing the filter element; and degassing the bulk material in the degassing housing by the at least one filter element by applying vacuum acting in at least one of the at least two pressure regions;

wherein the air transported along with the bulk material is exhausted by means of the at least one connection;

wherein the at least one filter element prevents part of the bulk material from being suctioned off; and wherein compressed air continues to be applied to the at least one filter element in order to backflush the filter element opposite the direction of suction.

18. The method according to claim 17, characterized in that the at least one filter element comprises a filter inliner for selectably disposed in the degassing housing.

19. The method according to claim 17, characterized in that the pressure regions have vacuum applied alternately and backflushing is enabled at the other pressure region respectively.

20. The method according to claim 17, characterized in that the inner surface of the filter element relative to an inner surface of the housing is set back by a gap.

* * * * *